United States Patent [19]

Kirker et al.

[11] Patent Number: 5,000,839

[45] Date of Patent: Mar. 19, 1991

[54] HYDROCRACKING PROCESS FOR PRODUCING A HIGH DENSITY JET FUEL

[75] Inventors: Garry W. Kirker, Washington Township, Washington County; Sadi Mizrahi; Stuart S. Shih, both of Cherry Hill, all of N.J.

[73] Assignee: Mobil Oil Corp., Fairfax, Va.

[21] Appl. No.: 479,789

[22] Filed: Feb. 14, 1990

[51] Int. Cl.$^5$ ............................................. C10G 69/10
[52] U.S. Cl. ........................................ 208/89; 208/111
[58] Field of Search ........................... 208/89, 111, 112

[56] References Cited

U.S. PATENT DOCUMENTS

| | | | |
|---|---|---|---|
| 4,820,402 | 4/1989 | Partridge et al. | 208/111 |
| 4,871,445 | 10/1989 | Koepke et al. | 208/112 |
| 4,894,142 | 1/1990 | Steigleder | 208/111 |
| 4,897,178 | 1/1990 | Best et al. | 208/89 |

*Primary Examiner*—Anthony McFarlane
*Attorney, Agent, or Firm*—Alexander J. McKillop; Charles J. Speciale; Dennis P. Santini

[57] ABSTRACT

A two-stage hydrocracking process for producing high density jet fuel from an aromatic feedstock using a synthetic zeolite catalyst. The feedstock is hydrotreated in the first stage to convert heteroatoms. After removal of sulfur and nitrogen compounds, the feed is directed to a hydrocracker where it contacted with MCM-22 zeolite.

26 Claims, 2 Drawing Sheets

HYDROCRACKING PROCESS FOR PRODUCING A HIGH DENSITY JET FUEL

BACKGROUND OF THE INVENTION

1. Field of the Invention

This invention relates to a process for hydrocracking a petroleum fraction employing a particular type of zeolite to provide a product having a high volumetric heat of combustion.

2. Background of the Art

Jet fuels are employed in a method of combustion wherein fuel is continuously introduced into and continuously burned in a confined space, for the purpose of deriving power directly from the hot products of combustion. Jet engines typically consist of a propulsion or jet tube, plus a gas turbine which extracts sufficient energy from the departing gases to drive the compressor. In present commercial forms, the compressor and turbine are assembled axially upon a common shaft, spaced far enough apart to permit a number of combustion chambers to be arranged about the shaft between the compressor and turbine, with an exhaust tube extending rearwardly from the turbine. The principal application of such engines is in powering aircraft, particularly for high-altitude operations. Therefore, the desiderata of fuels utilizable in jet combustion devices are many and varied.

Jet combustion fuels, as contemplated herein, are hydrocarbon fractions that can have initial boiling points as low as about 200° F. or lower, and end-boiling points as high as about 600° F. Depending upon the particular application, a jet fuel can boil within a relatively low range of temperatures or within a relatively high range of temperatures. For example, in order to insure quick starting in the operation of military jet-propelled aircraft, jet combustion fuels that boil within rather low temperature ranges are used. These fuels, however, have a high A.P.I. Gravity, and accordingly, they will have less weight per gallon. As the weight per gallon together with the number of b.t.u. per unit weight is determinative of the amount of power per gallon of fuel, it is desirable to have the A.P.I. Gravity as low as possible.

In order to improve aircraft performance, the aviation industry in general, and the military in particular, are interested in high density jet fuels which can provide a higher volumetric heat of combustion. A new jet fuel, JP-8X has been proposed, which has a density much higher than that of the current JP-8 fuel.

Use of hydrocracking to increase jet fuel supplies is not new. Zeolites, both natural and synthetic, crystalline aluminosilicates, are typically employed as catalysts for hydrocracking, as well as for other processes. The feature which gives zeolites their special utility as catalysts is that they are porous microcrystalline structures. Pore size and shape determine the selectivity of a particular type of zeolite for particular reaction products. Catalytic behavior of a zeolite is also affected by the composition, i.e., its silica/alumina ratio. Zeolites are often used in conjunction with other materials, such as metals, e.g., platinum, nickel, molybdenum, tungsten and/or oxides, e.g., $Al_2O_3$, $SiO_2$.

The crystal structure of zeolites may be determined by x-ray diffraction analysis, which gives a diffraction pattern unique to each type of zeolite.

With respect to hydrocracking, catalysts, including various zeolites, have been used in the past.

U.S. Pat. No. 4,875,992 (Hamner) describes a process for making high density jet fuel by contacting a hydrotreated aromatic feedstock with a fluorided Group VIII metal on alumina catalyst.

U.S. Pat. No. 4,764,266 (Chen et al.) discloses a hydroprocessing scheme in which high boiling fractions such as gas oil and cracked cycle oils are converted into jet fuels and naphthas suitable for reforming into high octane gasoline by hydrocracking with a large pore zeolite X or zeolite Y catalyst followed by hydroprocessing with zeolite beta.

U.S. Pat. No. 4,486,296 (Oleck et al.) describes a process for hydrocracking and dewaxing hydrocarbon oils using a catalyst comprising a hydrogenation metal, zeolite beta, and other zeolites.

U.S. Pat. No. 4,612,108 (Angevine et al.) discloses a hydrocracking process for feedstocks containing high boiling waxy components using a number of sequential beds of hydrocracking catalyst based on zeolite beta.

U.S. Pat. No. 4,435,275 (Derr et al.) discloses a hydrocracking process for aromatics production employing a zeolite in conjunction with a metal of Group IVA or VIIIA.

U.S. Pat. No. 3,923,641 (Morrison) discloses a process for hydrocracking a naphtha fraction using a zeolite beta.

U.S. Pat. No. 3,150,071 (F. G. Ciapetta et al.) discloses a jet combustion fuel produced by hydrocracking a hydrocarbon distillate fraction using a platinum or palladium type catalyst on a refractory oxide support.

SUMMARY OF THE INVENTION

In accordance with the present invention a Platinum/MCM-22 catalyst is used as the second stage hydrocracking catalyst in a 10 conventional two stage distillate hydrocracking process to yield a product containing high density jet fuel. The feedstock is of high aromatic content (i.e., 50% or more aromatics) and can include gas oil, vacuum gas oil, light cycle oil, catalytic cracker cycle oil, or any feedstock boiling from about 150° F. to 1100° F. The feedstock is first contacted with a hydrotreating catalyst to remove heteroatoms, and is sent to a stripper to remove sulfur compounds, nitrogen compounds, and light gases. The stripper effluent is then contacted with MCM-22 under hydrocracking conditions and the effluent is fractionated to remove a jet fuel product.

The jet fuel product produced by the catalyst of the present invention is highly enriched in cycloparaffins, and it has a high density and volumetric heat of combustion.

DETAILED DESCRIPTION OF THE INVENTION

Figure 1:
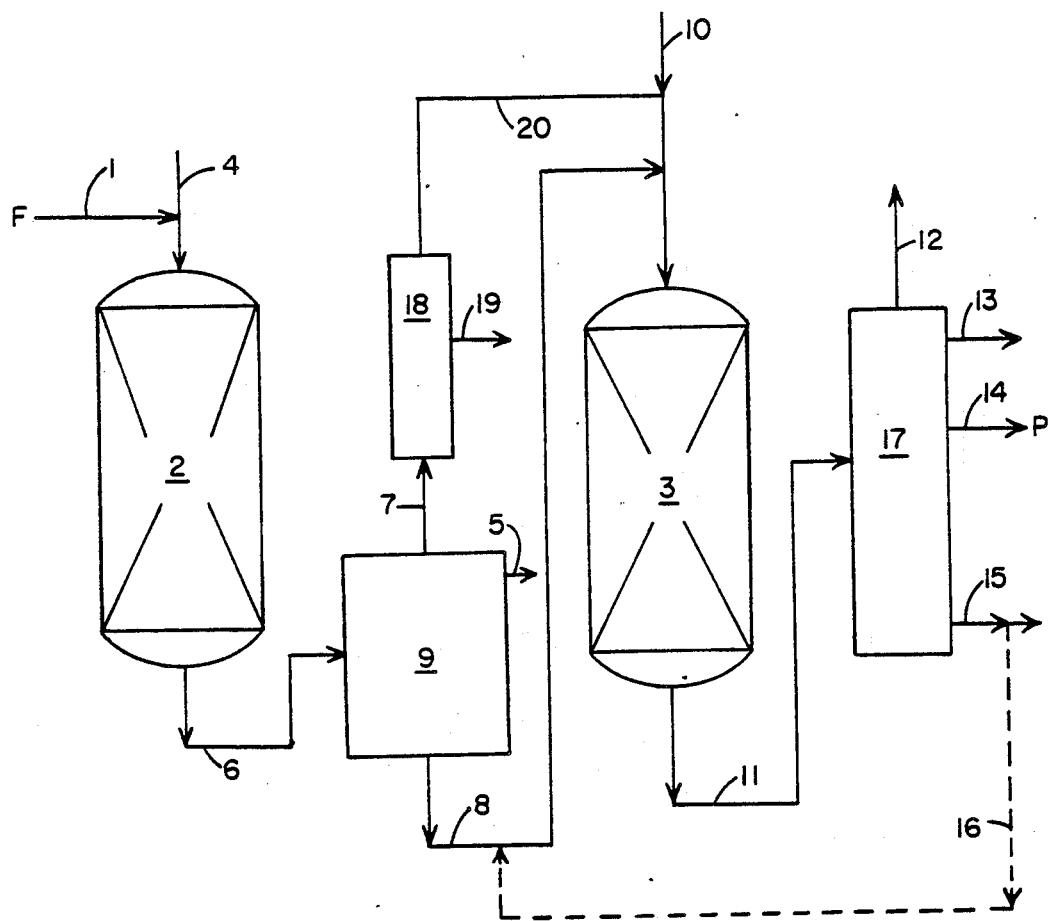
FIG. 1 is a flow diagram of the method of the present invention.

Referring to FIG. 1, in the process of the present invention an initial feedstock F is introduced via stream 1 into the first stage of the hydrocracking process, i.e., hydrotreater 2, to convert nitrogen and sulfur containing compounds to gaseous ammonia and hydrogen sulfide. The hydrotreating step employed herein is known and conventional and contemplates known conditions. The effluent from hydrotreater 2 is sent to stripper 9 where hydrogen, light hydrocarbons, sulfur and nitrogen compounds are removed. The effluent 8 of the stripper comprises a treated feedstock which is then sent to the hydrocracker 3 after being mixed with hydrogen from streams 10 and 20.

More particularly, the initial feedstock for the process can be a heavy oil fraction having an initial boiling point of 150° F. or higher. Suitable feedstocks of this type include gas oils such as vacuum gas oil, or coker gas oil, visbreaker oil, deasphalted oil or catalytic cracker cycle oil. Normally, the initial feedstock will have an extended boiling range, e.g., about 400° F. to 1100° F. but may be of more limited ranges with certain feedstocks. The nitrogen content generally will be in the range 200 to 1000 ppmw. The sulfur content may range as high as 5 percent by weight. Generally, jet fuels cannot contain a high concentration of aromatics. The process of the present invention can upgrade a highly aromatic feedstock, for example, light cycle oil (LCO) feedstock to produce a jet fuel product rich in cycloparaffins, which is desirable for a high density fuel. Alternatively, the "jet fuel" product of the present process can also be used as a low sulfur, low aromatic clean diesel fuel. Therefore, it should be understood that the term "jet fuel" herein shall also include "diesel fuel".

In a first stage of the process the feed 1 is passed over a hydrotreating catalyst with hydrogen from stream 4 to convert nitrogen and sulfur containing compounds to gaseous ammonia and hydrogen sulfide. At this stage, hydrocracking is minimized but partial hydrogenation of polycyclic aromatics proceeds, together with a limited degree of conversion to lower boiling (400° F.) products. The catalyst used in this stage is a conventional hydrotreating catalyst. Catalysts of this type are relatively immune to poisoning by the nitrogenous and sulfurous impurities in the feedstock and, generally comprise a non-noble metal component supported on an amorphous, porous carrier such as silica, alumina, silica-alumina or silica-magnesia. Because extensive cracking is not desired in this stage of the process, the acidic functionality of the carrier may be relatively low compared to that of the subsequent hydrocracking catalyst. The metal component may be a single metal from Groups IVB, VB, VIB and VIII of the Periodic Table such as nickel, cobalt, chromium, vanadium, molybdenum, tungsten, or a combination of metals such as nickel-molybdenum, cobalt-nickel-molybdenum, cobalt-molybdenum, nickel-tungsten or nickel-tungsten-titanium. Generally, the metal component will be selected for good hydrogen transfer activity; the catalyst as a whole will have good hydrogen transfer and minimal cracking characteristics. The catalyst should be pre-sulfided in the normal way in order to convert the metal component (usually impregnated into the carrier and converted to oxide) to the corresponding sulfide.

In the hydrotreating (denitrogenation and desulfurization) stage, the nitrogen and sulfur impurities are converted to ammonia and hydrogen sulfide. At the same time, the polycyclic aromatics are partially hydrogenated to form substituted aromatics which are more readily cracked in the second stage to form alkyl aromatics.

The process of the present invention employs an interstage separation. Thus, the effluent 6 from hydrotreater 2 is sent into a stripper 9 where light gases such as hydrogen, hydrogen sulfide, ammonia and $C_1$ to $C_4$ hydrocarbons are removed in stream 7 and are treated in 18 to remove ammonia and hydrogen sulfide, which are poisonous to the hydrocracking catalyst, and are removed via stream 19. The gas treatment in 18 may involve several separate steps commonly practiced to strip $H_2S$ and ammonia from hydrocarbon gas streams. Stream 19 represents a number of separate streams containing the $H_2S$ and $NH_3$ extracted from stream 7. The hydrogen-rich gas is sent to the hydrocracker 3 via stream 20. Additional hydrogen, if necessary, can be added via stream 10. A naphtha fraction, produced in the hydrotreating stage 2, can be drawn off at stream 5 by operating the stripper at a sufficiently high temperature. Naphtha removal from the second stage feed minimizes secondary cracking of naphtha to light gases in the hydrocracking stage. The bottoms product 8 from the stripper 9 is then fed to hydrocracker 3.

The hydrocracker feed 8, is mixed with hydrogen from streams 20 and 10 and contacted with a noble metal-containing zeolite MCM-22 catalyst. The space velocity of the hydrocarbon oil is usually in the range of 0.1 to 10 LHSV, preferably 0.5 to 2.0 LHSV. The hydrogen circulation rate can be seen in the range of 250 to 10,000 SCF/bbl, and preferably 4,000 to 6,000 SCF/bbl. Hydrogen partial pressure is usually at least 60% of the total system pressure at the reactor inlet, with inlet pressures normally being in the range of ,1,000 to 3,000 psig and 10. more commonly 1,200 to 2,000 psig. At the beginning of the process cycle the temperature required is normally 500° F. to 600° F., and as the catalyst ages higher temperatures may be required. Temperatures above about 850° F. are not normally used.

The effluent stream 11 from hydrocracker 3 is then sent to fractionating column 17 whereupon hydrogen and $C_1$ to $C_4$ hydrocarbons are removed from the top in stream 12, a naphtha fraction 13 is separated, and a jet fuel fraction 14 is drawn off as product P. The bottoms product 15, a fraction boiling at 550° F. or above, may optionally be sent back to the hydrocracker 3 and recycled to extinction via stream 16 to maximize jet fuel if desired.

The synthetic porous crystalline material employed as catalyst in the process of this invention, referred to herein as "zeolite MCM-22" or simply "MCM-22", exhibits unusual sorption capacities and unique catalystic utility when compared to other similar crystalline materials, such as, for example, the composition of U.S. Pat. No. 4,439,409.

In its calcined form, the synthetic porous crystalline material component employed in the catalyst composition used in the process of this invention is characterized by an X-ray diffraction pattern including the following lines:

TABLE I

| Interplanar d-Spacing (A) | Relative Intensity, $I/I_o \times 100$ |
|---|---|
| 30.0 ± 2.2 | W-M |
| 22.1 ± 1.3 | W |
| 12.36 ± 0.4 | M-VS |
| 11.03 ± 0.2 | M-S |
| 8.83 ± 0.14 | M-VS |
| 6.18 ± 0.12 | M-VS |
| 6.00 ± 0.10 | W-M |
| 4.06 ± 0.07 | W-S |
| 3.91 ± 0.07 | M-VS |

TABLE I-continued

| Interplanar d-Spacing (A) | Relative Intensity, I/I$_o$ × 100 |
|---|---|
| 3.42 ± 0.06 | VS |

More specifically, the calcined form may be characterized by an X-ray diffraction pattern including the following lines

TABLE II

| Interplanar d-Spacing (A) | Relative Intensity, I/I$_o$ × 100 |
|---|---|
| 30.0 ± 2.2 | W-M |
| 22.1 ± 1.3 | W |
| 12.36 ± 0.4 | M-VS |
| 11.03 ± 0.2 | M-S |
| 8.83 ± 0.14 | M-VS |
| 6.86 ± 0.14 | W-M |
| 6.18 ± 0.12 | M-VS |
| 6.00 ± 0.10 | W-M |
| 5.54 ± 0.10 | W-M |
| 4.92 ± 0.09 | W |
| 4.64 ± 0.08 | W |
| 4.41 ± 0.08 | W-M |
| 4.25 ± 0.08 | W |
| 4.10 ± 0.07 | W-S |
| 4.06 ± 0.07 | W-S |
| 3.91 ± 0.07 | M-VS |
| 3.75 ± 0.06 | W-M |
| 3.56 ± 0.06 | W-M |
| 3.42 ± 0.06 | VS |
| 3.30 ± 0.05 | W-M |
| 3.20 ± 0.05 | W-M |
| 3.14 ± 0.05 | W-M |
| 3.07 ± 0.05 | W |
| 2.99 ± 0.05 | W |
| 2.82 ± 0.05 | W |
| 2.78 ± 0.05 | W |
| 2.68 ± 0.05 | W |
| 2.59 ± 0.05 | W |

These values were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the diffractometer. From these, the relative intensities, 100 I/I$_o$, where I$_o$ is the intensity of the strongest line or peak, and d (obs.) the interplanar spacing in Angstrom Units (A), corresponding to the record lines, were determined. In Tables I and II, the relative intensities are given in terms of the symbols W=weak, M=medium, S=strong, VS=very strong. In terms of intensities, these may be generally designated as follows:
 W=0-20
 M=20-40
 S=40-60
 VS=60-100

It should be understood that these X-ray diffraction patterns are characteristic of all species of the zeolite. The sodium form as well as other cationic forms reveal substantially the same pattern with some minor shifts in interplanar spacing and variation in relative intensity. Other minor variations can occur depending on the ratio of structural components, e.g. silicon to aluminum mole ratio of the particular sample, as well as its degree of thermal treatment.

Zeolite MCM-22 has a composition involving the molar relationship:

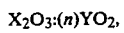

$X_2O_3:(n)YO_2$, wherein X is a trivalent element, such as aluminum, boron, iron and/or gallium, preferably aluminum, Y is a tetravalent element such as silicon and/or germanium, preferably silicon, and n is at least about 10, usually from about 10 to about 150, more usually from about 10 to about 60, and even more usually from about 20 to about 40. In the as-synthesized form, zeolite MCM-22 has a formula, on an anhydrous basis and in terms of moles of oxides per n moles of YO$_2$, as follows:

$(0.005-0.1)Na_2O:(1-4)R:X_2O_3:nYO_2$ wherein R is an organic component. The Na and R components are associated with the zeolite as a result of their presence during crystallization, and are easily removed by post-crystallization methods hereinafter more particularly described.

Zeolite MCM-22 is thermally stable and exhibits a high surface area greater than about 400 m$^2$/gm as measured by the BET (Bruenauer, Emmet and Teller) test and unusually large sorption capacity when compared to previously described crystal structures having similar X-ray diffraction patterns. As is evident from the above formula, MCM-22 is synthesized nearly free of Na cations and thus possesses acid catalysis activity as synthesized. It can, therefore, be used as a component of the catalyst composition herein without having to first undergo an exchange step. To the extent desired, however, the original sodium cations of the as-synthesized material can be replaced in accordance with techniques well known in the art, at least in part, by ion exchange with other cations. Preferred replacement ions include metal ions, hydrogen ions, hydrogen precursors, e.g., ammonium ions and mixtures thereof. Preferred ions are those which tailor the activity of the catalyst for hydrocracking. These include hydrogen, rare earth metals and metals of Groups IIA, IIIA, IVA, IB, IIB, IIIB, IVB and VIII of the Periodic Table of the Elements. Particularly preferred is a combination of nickel and tungsten or nickel and molybdenum.

In its calcined form, zeolite MCM-22 appears to be made up of a single crystal phase with little or no detectable impurity crystal phases and has an X-ray diffraction pattern including the lines listed in above Tables I and II.

Prior to its use in the catalyst composition herein, the synthetic porous crystalline material zeolite should be subjected to thermal treatment to remove part or all of any organic constituent present therein.

The zeolite present in the catalyst composition herein can also be used in intimate combination with a hydrogenating metal component from Group VIB and Group VIII of the Periodic Chart of the Elements. Group VIB metals include chromium, molybdenum, and tungsten. Group VIII metals include iron, cobalt, and nickel. Also includable in the catalyst are manganese and rhenium (Group VIIB), and vanadium (Group VB). Such component can be associated chemically and/or physically with the zeolite and/or matrix with which the zeolite may be optionally composited. Thus, e.g., the hydrogenating component can be introduced into the catalyst composition by way of co-crystallization, exchanged into the composition to the extent a Group IIIA element (e.g., aluminum) is in the structure, impregnated therein or intimately physically admixed therewith. Such component can be impregnated in, or on, the zeolite, for example by treating the zeolite with a solution containing the metal-containing ion.

The zeolite, especially in its metal, hydrogen and ammonium forms, can be beneficially converted to another form by thermal treatment. This thermal treatment is generally performed by heating one of these forms at a temperature of at least about 370° C. for at least one minute and generally not longer than 20 hours. While subatmospheric pressure can be employed for the thermal treatment, atmospheric pressure is used simply for reasons of convenience. The thermal treatment can be performed at a temperature of up to about 925° C.

Prior to its use in the catalyst composition and process of this invention, the zeolite crystals should be at least partially dehydrated. This can be accomplished by heating the crystals to a temperature in the range of from about 200° C. to about 595° C. in an atmosphere such as air, nitrogen, etc., and at atmospheric, subatmospheric pressures for a period of from between about 30 minutes to about 48 hours. Dehydration can also be performed at room temperature merely by placing the crystalline material in a vacuum but a longer time will be required to achieve a suitable degree of dehydration.

Zeolite MCM-22 can be prepared form a reaction mixture containing sources of alkali or alkaline earth metal (M), e.g., sodium or potassium, cation, an oxide of trivalent element X, e.g., aluminum, an oxide of tetravalent element Y, e.g., silicon, an organic (R) directing agent, hereinafter more particularly described, and water, said reaction mixture having a composition, in terms of mole ratios of oxides, within the following ranges:

| Reactants | Useful | Preferred |
| --- | --- | --- |
| $YO_2/X_2O_3$ | 10–60 | 10–40 |
| $H_2O/YO_2$ | 5–100 | 10–50 |
| $OH^-/YO_2$ | 0.01–1.0 | 0.1–0.5 |
| $M/YO_2$ | 0.01–2.0 | 0.1–1.0 |
| $R/YO_2$ | 0.05–1.0 | 0.1–0.5 |

In a preferred method of synthesizing zeolite MCM-22, the $YO_2$ reactant contains a substantial amount of solid $YO_2$, e.g., at least about 30 wt. % solid $YO_2$. Where $YO_2$ is silica, the use of a silica source containing at least about 30 wt. % solid silica, e.g., Ultrasil (a precipitated, spray dried silica containing about 90 wt. % silica) or HiSil (a precipitated hydrated $SiO_2$ containing about 87 wt. % silica, about 6 wt. % free $H_2O$ and about 4.5 wt. % bound $H_2O$ of hydration and having a particle size of about 0.02 micron) favors MCM-22 crystal formation from the above mixture and is a distinct difference over the synthesis method disclosed in U.S. Pat. No. 4,439,409 for synthesis of the "PSH-3" composition. If another source of oxide of silicon, e.g., Q-Brand (a sodium silicate comprised of about 28.8 wt. % of $SiO_2$, 8.9 wt. % $Na_2O$ and 62.3 wt. % H20) is used, crystallization may yield little if any MCM-22 crystalline material and impurity phases of other crystal structures, e.g., ZSM-12, may be produced. Preferably, therefore, the $YO_2$, e.g. silica, source contains at least 30 wt. % solid $YO_2$, e.g. silica, and more preferably at least 40 wt. % solid $YO_2$, e.g. silica.

Crystallization of the MCM-22 crystalline material can be carried out at either static or stirred conditions in a suitable reactor vessel such as, e.g., polypropylene jars or teflon-lined or stainless steel autoclaves. The total useful range of temperatures for crystallization is from about 80° C. to about 225° C. for a time sufficient for crystallization to occur at the temperature used, e.g., from about 25 hours to about 60 days. Thereafter, the crystals are separated from the liquid and recovered.

The organic directing agent for use in synthesizing zeolite MCM-22 from the above reaction mixture is hexamethyleneimine.

It should be realized that the reaction mixture components can be supplied by more than one source. The reaction mixture can be prepared either batchwise or continuously. Crystal size and crystallization time of the MCM-22 material will vary with the nature of the reaction mixture employed and the crystallization conditions. In all cases, synthesis of the MCM-22 crystals is facilitated by the presence of at least about 0.01 percent, preferably about 0.10 percent and still more preferably about 1 percent, seed crystals based on the total weight of the crystalline product formed.

The zeolite crystals can be shaped into a wide variety of particle sizes. Generally speaking, the particles can be provided in the form of a powder, a granule or a molded product such as an extrudate having a particle size sufficient to pass through a 2 mesh (Tyler) screen and be substantially retained on a 400 mesh (Tyler) screen. In cases where the catalyst is molded, such as by extrusion, the crystals can be extruded before drying or partially dried and then extruded.

It may be desired to incorporate the zeolite crystalline material with another material, i.e., a binder, which is resistant to the temperatures and other conditions employed in the process of this invention. Suitable binder materials include active and inactive materials and synthetic or naturally occurring zeolites as well as inorganic materials such as clays, silica and/or metal oxides such as alumina. The latter can be either naturally occurring or provided in the form of a gelatinous precipitates or gels including mixtures of silica and metal oxides. Use of a binder material in conjunction with the zeolite, i.e., combined therewith or present during its synthesis, which itself is catalytically active may change the conversion and/or selectivity of the catalyst. Inactive materials suitably serve as diluents to control the amount of conversion so that products can be obtained economically and in a controlled fashion without having to employ other means for controlling the rate of reaction. These materials can be incorporated into naturally occurring clays, e.g., bentonite and kaolin, to improve the crush strength of the zeolite under commercial operating conditions. Good crush strength is an advantageous attribute for commercial use since it prevents or delays breaking down of the catalyst into powder-like materials.

Naturally occurring clays which can be composited with the zeolite crystals include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the zeolite also include inorganic oxides, notably alumina.

Apart from or in addition to the foregoing binder materials, the zeolite crystals can be composited with an inorganic oxide matrix such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia, silica-magnesia-zirconia, etc. It may also be advantageous to provide at least a part of the foregoing matrix materials in colloidal form so as to facilitate extrusion of the bound catalyst component(s).

The relative proportions of finely divided crystalline material and inorganic oxide matrix can vary widely with the zeolite content ranging from about 1 to about 95 percent by weight and more usually, particularly when the composite is prepared in the form of beads, in the range of about 2 to about 80 weight percent of the composite.

The stability of zeolite MCM-22 may be increased by combining the as-synthesized MCM-22 with an alumina binder, converting the alumina-bound MCM-22 to the hydrogen form, (i.e., HMCM-22) and steaming the alumina-bound HMCM-22 composition under conditions sufficient to increase the stability of the catalyst. U.S. Pat. Nos. 4,663,492; 4,594,146; 4,522,929; and, 4,429,176, the entire disclosures of which are incorporated herein by reference, describe conditions for the steam stabilization of zeolite catalysts which can be utilized to steam-stabilize alumina-bound HMCM-22. The steam stabilization conditions include contacting the alumina bound HMCM-22 with, e.g., 5–100% steam at a temperature of at least about 300 (e.g., 300°–650° C.) for at least one hour (e.g., 1–200 hours) at a pressure of 101–2,500 kPa. In a more particular embodiment, the catalyst can be made to undergo steaming with 75–100% steam at 315°–500° C. and atmospheric pressure for 2–25 hours. In accordance with the steam stabilization treatment described in the above-mentioned patents, the steaming of the catalyst can take place under conditions sufficient to initially increase the Alpha Value of the catalyst, the significance of which is discussed infra. and produce a steamed catalyst having a peak Alpha Value. If desired, steaming can be continued to subsequently reduce the Alpha Value from the peak Alpha Value to an Alpha Value which is substantially the same as the Alpha Value of the unsteamed catalyst.

In order to more fully illustrate the process of this invention and the manner of practicing same, the following examples are presented. In examples which are illustrative of the synthesis of zeolite MCM-22, whenever adsorption data are set forth for comparison of sorptive capacities for water, cyclohexane and/or n-hexane, they were Equilibrium Adsorption values determined as follows:

A weighed sample of the calcined adsorbent was contacted with the desired pure adsorbate vapor in an adsorption chamber, evacuated to less than 1 mm Hg and contacted with 12 Torr of water vapor or 40 Torr of n-hexane or 40 Torr of cyclohexane vapor, pressures less than the vapor-liquid equilibrium pressure respective adsorbate at 90° C. The pressure was kept constant (within about ±0.5 mm Hg) by addition of adsorbate vapor controlled by a manostat during the adsorption period, which did not exceed about 8 hours. As adsorbate was adsorbed by the MCM-22 crystalline material, the decrease in pressure caused the manostat to open a valve which admitted more adsorbate vapor to the chamber to restore the above control pressures. Adsorption was complete when the pressure change was not sufficient to activate the manostat. The increase in weight was calculated as the adsorption capacity of the sample g/100 g of calcined adsorbant. Zeolite MCM-22 always exhibits Equilibrium Adsorption values of greater than about 10 wt. % for water vapor, greater than about 4.5 wt. %, usually greater than about 7 wt. % for cyclohexane vapor and greater than about 10 wt. % for n-hexane vapor. These vapor adsorption capacities are a notable distinguishing feature of zeolite MCM-22.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Pat. No. 3,354,078; in the *Journal of Catalysis*, vol. 4, p. 527 (1965); vol. 6, p. 278 (1966); and vol. 61, p. 395 (1980), each incorporated herein by reference as to that description. The experimental conditions of the test used herein include a constant temperature of 538° C. and a variable flow rate as described in detail in the *Journal of Catalysis*, vol. 61, p. 395.

Zeolite MCM-22 is compared herein with zeolite beta, which is described in U.S. Pat. Nos. 3,308,069 and Re. 28,341, herein incorporated by reference, and which is a known hydrocracking catalyst. See, U.S. Pat. No. 4,612,108, herein incorporated by reference.

Figure 2:
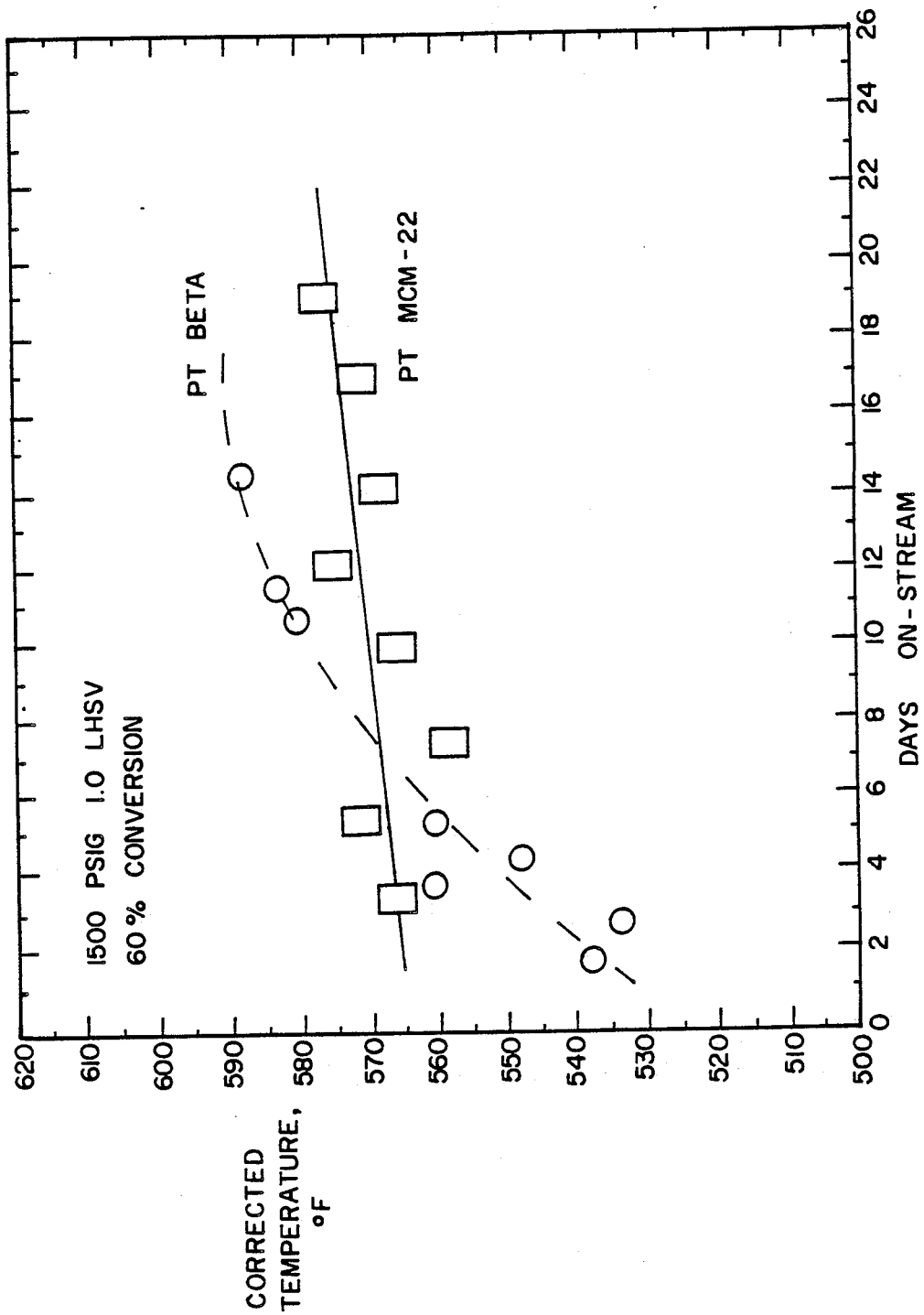
FIG. 2 illustrates a graphical comparison of the performance of the catalyst of the present invention with that of the prior known catalyst.

FIG. 2 illustrates a comparison of MCM-22 and zeolite beta with respect to the process hereindescribed showing performance of the two catalysts operated at 60% conversion to 390° F. materials. The results show that Pt/MCM-22 is stable and does not have a rapid aging period. Although less active than zeolite beta initially, Pt/MCM-22 became more active than zeolite beta after 8 days on stream. This aging pattern of Pt/MCM-22 is surprising and unique.

EXAMPLE 1

One part sodium aluminate (43.5% Al$_2$O$_3$, 32.2% Na$_2$O, 25.6% H$_2$O) was dissolved in a solution containing 1 part of 50% NaOH solution and 103.13 parts H$_2$O. To this was added 4.50 parts hexamethyleneimine. The resulting solution was added to 8.55 parts of Ultrasil, a precipitated, spray-dried silica (90% SiO$_2$). The reaction mixture had the following composition, in mole ratios:

SiO$_2$/Al$_2$O$_3$=30.0
OH$^-$/SiO$_2$=0.18
H$_2$O/SiO$_2$=44.9
Na/SiO$_2$=0.18
R/SiO$_2$=0.35 where R is hexamethyleneimine. The mixture was crystallized in a stainless steel reactor, with stirring, at 150° C. for 7 days. The crystalline product was filtered, washed with water and dried at 120° C. After a 20 hour calcination at 538° C., the X-ray diffraction pattern contained the major lines listed in Table III. The adsorption capacities of the calcined material were measured to be:

H$_2$O; 15.2 wt. %
Cyclohexane; 14.6 wt. %
n-Hexane; 16.7 wt. %

The surface area of the zeolite was measured to be 494 m$^2$/g. The chemical composition of the uncalcined material was determined to be as follows:

| Component | wt. % |
| --- | --- |
| SiO$_2$ | 66.9 |
| Al$_2$O$_3$ | 5.40 |

-continued

| Component | wt. % |
|---|---|
| Na | 0.03 |
| N | 2.27 |
| Ash | 76.3 |
| $SiO_2O/Al_2O_3$, mole ratio 21.10 | |

TABLE III

| Degrees 2-Theta | Interplanar d-Spacing (A) | $I/I^o$ |
|---|---|---|
| 2.80 | 31.55 | 25 |
| 4.02 | 21.98 | 10 |
| 7.10 | 12.45 | 96 |
| 7.95 | 11.12 | 47 |
| 10.00 | 8.85 | 51 |
| 12.90 | 6.86 | 11 |
| 14.34 | 6.18 | 42 |
| 14.72 | 6.02 | 15 |
| 15.90 | 5.57 | 20 |
| 17.81 | 4.98 | 5 |
| 20.20 | 4.40 | 20 |
| 20.91 | 4.25 | 5 |
| 21.59 | 4.12 | 20 |
| 21.92 | 4.06 | 13 |
| 22.67 | 3.92 | 30 |
| 23.70 | 3.75 | 13 |
| 24.97 | 3.57 | 15 |
| 25.01 | 3.56 | 20 |
| 26.00 | 3.43 | 100 |
| 26.69 | 3.31 | 14 |
| 27.75 | 3.21 | 15 |
| 28.52 | 3.13 | 10 |
| 29.01 | 3.08 | 5 |
| 29.71 | 3.01 | 5 |
| 31.61 | 2.830 | 5 |
| 32.21 | 2.779 | 5 |
| 33.35 | 2.687 | 5 |
| 34.61 | 2.592 | 5 |

EXAMPLE 2

A portion of the calcined crystalline product of Example 1 was tested in the Alpha Test and was found to have an Alpha Value of 224.

EXAMPLES 3-5

Three separate synthesis reaction mixtures were prepared with compositions indicated in Table IV. The mixtures were prepared with sodium aluminate, sodium hydroxide, Ultrasil, hexamethyleneimine (R) and water. The mixtures were maintained at 150° C., 143° C. and 150° C., respectively, for 7, 8 and 6 days respectively in stainless steel autoclaves at autogenous pressure. Solids were separated from any unreacted components by filtration and then water washed, followed by drying at 120° C. The product crystals were subjected to X-ray diffraction, adsorption, surface area and chemical analyses. The results of the sorption, surface area and chemical analyses are presented in Table IV. The adsorption and surface area measurements were of the calcined product.

TABLE IV

| Example | 3 | 4 | 5 |
|---|---|---|---|
| Synthesis Mixture, mole ratios | | | |
| $SiO_2/Al_2O_3$ | 30.0 | 30.0 | 30.0 |
| $OH^-/SiO_2$ | 0.18 | 0.18 | 0.18 |
| $H_2O/SiO_2$ | 19.4 | 19.4 | 44.9 |
| $Na/SiO_2$ | 0.18 | 0.18 | 0.18 |
| $R/SiO_2$ | 0.35 | 0.35 | 0.35 |
| Product Composition, Wt. % | | | |
| $SiO_2$ | 64.3 | 68.5 | 74.5 |
| $Al_2O_3$ | 4.85 | 5.58 | 4.87 |
| Na | 0.08 | 0.05 | 0.01 |
| N | 2.40 | 2.33 | 2.12 |
| Ash | 77.1 | 20.9 | 26.0 |
| $SiO_2O/Al_2O_3$, mole ratio | | | |
| Adsorption. Wt. % | | | |
| $H_2O$ | 14.9 | 13.6 | 14.6 |
| Cyclohexane | 12.5 | 12.2 | 13.6 |
| n-Hexane | 14.6 | 16.2 | 19.0 |
| Surface Area, $m^2/g$ | 481 | 492 | 487 |

EXAMPLE 6

Quantities of the calcined (538° C. for 3 hours) crystalline silicate products of Examples 3, 4 and 5 were tested in the Alpha Test and found to have Alpha Values of 227, 180 and 187, respectively.

EXAMPLE 7

To demonstrate a further preparation of the present zeolite, 4.49 parts of hexamethyleneimine was added to a solution containing 1 part of sodium aluminate, 1 part of 50% NaOH solution and 44.19 parts of $H_2O$. To the combined solution was added 8.54 parts of Ultrasil silica. The mixture was crystallized with agitation at 145° C. for 59 hours and the resultant product was water washed and dried at 120° C. Product chemical composition, surface area and adsorption analyses results were as set forth in Table V:

TABLE V

| Product Composition (uncalcined) | |
|---|---|
| C | 12.1 wt. % |
| N | 1.98 wt. % |
| Na | 640 ppm |
| $Al_2O_3$ | 5.0 wt. % |
| $SiO_2$ | 74.9 wt. % |
| $SiO_2/Al_2O_3$, mole ratio | 25.4 |
| Adsorption, wt. % | |
| Cyclohexane | 9.1 |
| N-hexane | 14.9 |
| $H_2O$ | 16.8 |
| Surface Area, $m^2/g$ | 479 |

EXAMPLE 8

Twenty-five grams of solid crystal product from Example 7 were calcined in a flowing nitrogen atmospheres at 538° C. for 5 hours, followed by purging with 5% oxygen gas (balance $N_2$) for another 16 hours at 538° C.

Individual 3g samples of the calcined material ion-exchanged 100 ml of 0.1N TEABr, TPABr and $LaCl_3$ solution separately. Each exchange was carried out at ambient temperature for 24 hours and repeated three times. The exchanged samples were collected by filtration, water-washed to be halide-free and dried. The compositions of the exchanged samples are tabulated below demonstrating the exchange capacity of the present crystalline silicate for different ions.

| Exchange Ions Ionic Composition, wt. % | TEA | TPA | La |
|---|---|---|---|
| Na | 0.095 | 0.089 | 0.063 |
| N | 0.30 | 0.38 | 0.03 |
| C | 2.89 | 3.63 | — |
| La | — | — | 1.04 |

EXAMPLE 9

The La-exchanged sample from Example 8 was sized to 14 to 25 mesh and then calcined in air at 538° C. for 3 hours. The calcined material had an Alpha Value of 173.

EXAMPLE 10

The calcined sample La-exchanged material from Example 9 was severely steamed at 649° C. in 100% steam for 2 hours. The steamed sample had an Alpha Value of 22, demonstrating that the zeolite had very good stability under severe hydrothermal treatment.

EXAMPLE 11

This example illustrates the preparation of the present zeolite where X in the general formula, supra, is boron. Boric acid, 2.59 parts, was added to a solution containing 1 part of 45% KOH solution and 42.96 parts $H_2O$. To this was added 8.56 parts of Ultrasil silica, and the mixture was thoroughly homogenized. A 3.88 parts quantity of hexamethyleneimine was added to the mixture.

The reaction mixture had the following composition in mole ratios:

$SiO_2/B_2O_3 = 6.1$
$OH^-/SiO_2 = 0.06$
$H^2O/SiO_2 = 19.0$
$K/SiO_2 = 0.06$
$R/SiO_2 = 0.30$ where R is hexamethyleneimine.

The mixture was crystallized in a stainless steel reactor, with agitation, at 150° C. for 8 days. The crystalline product was filtered, washed with water and dried at 120° C. A portion of the product was calcined for 6 hours at 240° C. and found to have the following adsorption capacities:

$H_2O$: 11.7 wt. %
Cyclohexane: 7.5 wt. %
n-Hexand: 11.4 wt. %

The surface area of the calcined crystalline material was measured (BET) to be 405 m²/g.

The chemical composition of the uncalcined material was determined to be as follows:

N: 1.94 wt. %
Na: 175 ppm
K: 0.60 wt. %
Boron: 1.04 wt. %
$Al_2O_3$: 920 ppm
$SiO_2$: 75.9 wt. %
Ash: 74.11 wt. %
$SiO_2/Al_2O_3$, molar ratio: 1406
$SiO_2/(Al+B)_2O_3$, molar ratio 25.8

EXAMPLE 12

A portion of the calcined crystalline product of Example 11 was treated with $NH_4Cl$ and again calcined. The final crystalline product was tested in the Alpha test and found to have an Alpha Value of 1.

EXAMPLE 13

This example illustrates another preparation of the zeolite in which X of the general formula, supra. is boron. Boric acid, 2.23 parts, was added to a solution of 1 part of 50% NaOH solution and 73.89 parts $H_2O$. To this solution was added 15.29 parts of HiSil silica followed by 6.69 parts of hexamethyleneimine. The reaction mixture had the following composition in mole ratios:

$SiO_2/B_2O_3 = 12.3$
$OH^-/SiO_2 = 0.056$
$H_2O/SiO_2 = 18.6$
$K/SiO_2 = 0.056$
$R/SiO_2 = 0.30$ where R is hexamethyleneimine.

The mixture was crystallized in a stainless steel reactor, with agitation, at 300° C. for 9 days. The crystalline product was filtered, washed with water and dried at 120° C. The adsorption capacities of the calcined material (6 hours at 540° C.) were measured:

$H_2O$: 14.4 wt. %
Cyclohexane: 4.6 wt. %
n-Hexane: 14.0 wt. %

The surface area of the calcined crystalline material was measured to be 438 m²/g.

The chemical composition of the uncalcined material was determined to be as follows:

| Component | Wt. % |
| --- | --- |
| N | 2.48 |
| Na | 0.06 |
| Boron | 0.83 |
| $Al_2O_3$ | 0.50 |
| $SiO_2$ | 73.4 |
| $SiO_2/Al_2O_3$, molar ratio | 249 |
| $SiO_2/(Al + B)_2O_3$, molar ratio | 28.2 |

EXAMPLE 14

A portion of the calcined crystalline product of Example 13 was tested in the Alpha Test and found to have an Alpha Value of

EXAMPLE 15

An initial feed comprising 80% light cycle oil, i.e., the effluent from the first stage of a commercial hydrocracking unit, was provided. The initial feed had properties set forth in Table VI.

TABLE VI

| Properties of raw feed containing 80% LCO | |
| --- | --- |
| General properties | |
| API Gravity | 18.4 |
| Hydrogen, wt. % | 10.4 |
| Sulfur, ppmw | 1.8 |
| Nitrogen, ppmw | 590 |
| Freeze Point, °F. | 25 |
| Smoke Point, mm | Not Available |
| FIA Composition, vol. % | |
| Saturates | 32.6 |
| Olefins | 6.5 |
| Aromatics | 60.9 |
| Distillation, °F. | |
| IBP | 328 |
| 10% | 472 |
| 30% | 418 |
| 50% | 562 |
| 70% | 612 |
| 90% | 676 |
| EP | 770 |

This initial raw feed was hydrotreated conventionally to provide a low sulfur, low nitrogen hydrocracking feed having the properties set forth in Table VII.

TABLE VII

| After Hydrotreating | |
|---|---|
| General properties | |
| API Gravity | 28.5 |
| Hydrogen, wt. % | 12.59 |
| Sulfur, ppmw | <20 |
| Nitrogen, ppmw | <2 |
| Freeze Point, °F. | 25 |
| Smoke Point, mm | 10 |
| FIA Composition, vol. % | |
| Saturates | 39.7 |
| Olefins | 1.8 |
| Aromatics | 58.5 |
| Distillation, °F. | |
| IBP | 162 |
| 10% | 389 |
| 30% | 458 |
| 50% | 505 |
| 70% | 556 |
| 90% | 643 |
| EP | 786 |

The feedstock contained 58.5 vol. % aromatics and was not suitable for use as jet fuel.

EXAMPLE 16

A sample of platinum exchanged MCM-22 catalyst was prepared by providing MCM-22 prepared in accordance with the method described in Example 1 and exchanged with ammonium nitrate. To this was added an aluminum oxide binder. The mixture was mulled, extruded and dried at 250° F. It was then calcined in nitrogen at 1000° F. for 3 hours. After humidification the mixture was exchanged with 1 N ammonium nitrate, dried and calcined again in nitrogen at 1000° F. The mixture was again humidified, exchanged with $Pt(NH_3)_4Cl_2$ solution for 8 hours, rinsed, dried and calcined at 660° F. in air. Catalyst properties are set forth in Table VIII of Example 18, infra.

EXAMPLE 17

Zeolite beta is a known and commonly used zeolite having a pore size greater than 5 Angstroms (A). The composition, X-ray diffraction pattern and method of preparing zeolite beta is described in U.S. Pat. Nos. 3,308,069 and Re. 28,341, both of which are herein incorporated by reference. A sample of steamed zeolite beta was provided, said sample being mixed with alumina binder, mulled, extruded, conventionally exchanged with platinum, and dried. The catalyst properties are set forth in Table VIII of Example 18, infra.

EXAMPLE 18

The samples of platinum exchanged zeolite MCM-22 and platinum exchanged zeolite beta of Examples 16 and 17 were provided, the catalyst samples having the properties shown in TABLE VIII.

TABLE VIII

| Catalyst Properties | | |
|---|---|---|
| | Pt/MCM-22 | Pt/Beta |
| Composition, wt. % | | |
| Zeolite | 65 | 65 |
| Platinum | 0.66 | 0.56 |
| Density, g/cc | | |
| Packed | 0.45 | 0.53 |
| Particle | 0.73 | 0.88 |
| Real | 2.60 | 2.57 |
| Physical Properties | | |
| Pore Volume, cc/g | 0.99 | 0.75 |
| Surface Area, m²/g | 372 | 369 |
| Avg. Pore Diameter, A | 106 | 81 |

The hydrotreated feedstock from Example 15 was sent through a hydrocracker pilot unit under hydrocracking conditions and operated at 1.0 hr$^{-1}$ LHSV, 1500 psig inlet hydrogen pressure and 5000 scf/bbl of once-through hydrogen circulation rate, the hydrocracker being charged respectively with the Pt/MCM-22 or the Pt/zeolite beta for the respective sample runs.

The 390° F.+ bottoms product passed the specifications for the JP-8X fuel for both catalysts, as shown in Table IX. However, Pt/MCM-22 produced a 390° F.+ bottoms product having a higher density and a significantly higher volumetric heat of combustion than that from the Pt/zeolite beta.

TABLE IX

| Comparison of the 390° F.+ Bottoms | | | | | |
|---|---|---|---|---|---|
| 390° F.+ | Pt MCM-22 | | Pt Beta | | JP-8X |
| Conversion, % | 37.3 | 49.3 | 60.7 | 61.7 | Spec. |
| 390° F.+ Bottoms | | | | | |
| API Gravity | 32.1 | 32.8 | 33.2 | 34.4 | <37 |
| Freeze Point, °F. | <−85 | <−85 | <−85 | <−85 | <−51 |
| Smoke Point, mm | 21.0 | 21.0 | 21.5 | 22.0 | >15 |
| Naphthalenes, vol. % | 0.13 | <0.1 | <0.1 | <0.1 | — |
| Net Heat of Combustion | | | | | |
| BTU/lb | 18444 | 18443 | 18487 | 18596 | — |
| BTU/Gallon | 132852 | 132290 | 132270 | 132069 | — |

As shown in TABLE X the same conclusions can be reached in the comparison of the 250° F. bottoms product. Also noteworthy is that Pt/MCM-22 can produce premium high quality jet fuel at conversions as low as 37.3%.

TABLE X

| Comparison of the 250° F+ Bottoms | | | | | |
|---|---|---|---|---|---|
| | Pt MCM-22 | | Pt Beta | | JP-8X |
| Conversion % | 37.3 | 49.3 | 60.7 | 61.5 | Spec. |
| 250° F.+ Bottoms | | | | | |
| API Gravity | 34.4 | 35.8 | 36.9 | 42.4 | <37 |
| Freeze Point, °F. | <−85 | <−85 | <−85 | <−85 | <−51 |
| Smoke Point, mm | — | 21.0 | — | 25.5 | >15 |
| Naphthalenes, vol. % | <0.1 | <0.1 | <0.1 | <0.1 | — |
| Aromatics, vol. % | <0.5 | <0.5 | <0.5 | 1.5 | — |
| Net Heat of Combustion | | | | | |
| BTU/lb | 18431 | 18443 | 18460 | 18480 | — |
| BTU/Gallon | 130915 | 129912 | 129183 | 125238 | — |

FIG. 2 charts the catalyst performance of Pt/MCM-22 vs. Pt/beta at 60% conversion. As can be seen, Pt/MCM-22 required a higher temperature initially to achieve 60% conversion, i.e., Pt/MCM-22 initially was less active than Pt/beta. However after 8 days on stream Pt/MCM-22 had a higher activity than Pt/beta and exhibited overall a stable level of activity without a rapid aging period as shown by Pt/beta.

Moreover, the naphtha fraction produced from Pt/MCM-22 was rich in cycloparaffins. TABLE XI shows a comparison between the naphtha fractions from Pt/MCM-22 and Pt/beta, respectively. The naphtha fraction ($C_5$-250° F. naphtha) of Pt/MCM-22 had a higher percentage of cycloparaffins and a higher density than that of the naphtha from Pt/beta. Even at 37.3% conversion the 250°–390° F. naphtha fraction of Pt/MCM-22 had a higher octane than that of Pt/beta.

TABLE XI

Comparison of Naphtha Properties

|  | Pt MCM-22 | | | Pt Beta |
|---|---|---|---|---|
| % Conversion | 37.3 | 49.3 | 60.7 | 61.5 |
| C5-250° F. Naphtha | | | | |
| Gravity, °API | 59.5 | 61.3 | 62.9 | 64 |
| Octane Number | | | | |
| R + 0 | 69.3 | 74.5 | 75.8 | 69.8 |
| M + 0 | 68.7 | 72.0 | 74.8 | — |
| Composition, wt. % | | | | |
| Paraffins | 23.3 | 20.2 | 25.6 | 35.6 |
| Cyclo-Paraffins* | 75.9 | 79.6 | 73.8 | 64.3 |
| Alkyl Aromatics | 0.8 | 0.2 | 0.6 | 0.3 |
| 250-390° F. Naphtha | | | | |
| Gravity, °API | 42.1 | 43.6 | 44.1 | 49.8 |
| Octane Number | | | | |
| R + 0 | 53.7 | 60.9 | 59.0 | 49.1 |
| M + 0 | 54.2 | 61.3 | 60.0 | — |
| Composition, wt. % | | | | |
| Paraffins | 6.8 | 6.4 | 5.2 | 24.6 |
| Cyclo-Paraffins | 91.2 | 91.9 | 93.1 | 75.0 |
| Alkyl Aromatics | 2.0 | 1.7 | 1.7 | 0.5 |

*Includes trace amount of olefins.

The bottoms of this process, almost free in sulfur and aromatics, is a premium diesel fuel as well as a premium jet fuel. Thus, the Pt/MCM-22 catalyst significantly improves process flexibility and makes possible the coproduction of gasoline (naphtha) and jet fuel (or diesel fuel) in the conventional hydrocracking process.

What is claimed is:

1. A process for producing jet fuel from a hydrocarbon feedstock comprising contacting said feedstock with a catalyst composition under hydrocracking conditions to produce a product characterized by an API gravity number of less than 37, said catalyst composition comprising at least one noble metal and a synthetic zeolite characterized by an X-ray diffraction pattern including values substantially as set forth in Table I of the specification.

2. The process of claim 1 wherein said zeolite is characterized by an X-ray diffraction pattern including values substantially as set forth in Table II of the specification.

3. The process of claim 1 wherein the synthetic zeolite has a composition comprising the molar relationship:

$$X_2O_3:(n)YO_2$$

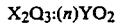

wherein X is a trivalent element selected from the group consisting of aluminum, boron, iron and gallium, Y is a tetravalent element selected from the group consisting of silicon and germanium, and n is at least about 10.

4. The process of claim 1 wherein said synthetic zeolite has been treated to replace original ions, at least in part, with an ion or mixture of ions selected from the group consisting of hydrogen, rare earth metals, and metals of Groups IIA, IIIA, IVA, IB, IIB, IIIB, IVB, VIB and VIII of the Periodic Table.

5. The process of claim 1 wherein said synthetic zeolite has been thermally treated at a temperature of up to about 925° C.

6. The process of claim 1 wherein the hydrocarbon feedstock contains at least about 50 weight percent aromatics.

7. The process of claim 1 wherein the feedstock is derived from hydrocarbon oils selected from the group consisting of gas oil, visbreaker oil, coker gas oil, deasphalted oil, catalytic cracker cycle oil, and a heavy oil fraction having an initial boiling point of 400° F. or higher.

8. The process of claim 1 wherein the hydrocracking conditions include a temperature of from about 500° F. to 850° F., a pressure of from about 1000 to 3000 psig, a liquid hourly space velocity of from about 0.1 to about 10 hr$^{-1}$ and a hydrogen circulation rate of from about 250 to 10,000 SCF/bbl.

9. The process of claim 1 wherein said noble metal is platinum or palladium.

10. The process of claim 1 wherein said catalyst comprises a binder.

11. The process of claim 10 wherein said binder is aluminum oxide.

12. The process of claim 1 wherein said feedstock comprises a hydrocarbon oil having a boiling range of between about 160° F. and about 800° F.

13. The process of claim 1 wherein said jet fuel also comprises diesel fuel.

14. The process of claim 1 wherein said jet fuel product has a volumetric heat of combustion above 132,200 BTU/gallon.

15. The process of claim 1 wherein said jet fuel product has a volumetric heat of combustion above 132,800 BTU/gallon.

16. The process of claim 1 wherein said feedstock has been hydrotreated to convert sulfur and nitrogen compounds to hydrogen sulfide and ammonia, respectively.

17. The process of claim 16 wherein said hydrogen sulfide and ammonia have been removed from said feedstock by a stripping process.

18. The process of claim 1 additionally comprising fractionating the product to separate jet fuel fraction.

19. The process of claim 18 wherein said jet fuel fraction boils at over 250° F.

20. The process of claim 18 wherein said jet fuel fraction boils at over 390° F.

21. The process of claim 18 wherein fractionating the high density product also separates a bottom fraction boiling at over 550° F.

22. The process of claim 21 wherein at least a portion of said bottoms fraction is recycled for recontacting said synthetic zeolite catalyst under hydrocracking conditions.

23. The process of claim 18 wherein fractionating the product also separates a naphtha fraction having a boiling range below 250° F.

24. The process of claim 23 wherein said naphtha fraction contains over 70 weight percent cycloparaffins.

25. The process of claim 1 wherein said zeolite is composited with a matrix material.

26. The process of claim 25 wherein said matrix material comprises an oxide selected from the group consisting of silica, alumina, zirconia, titania, beryllia, magnesia, thoria, and combinations thereof.

* * * * *

UNITED STATES PATENT AND TRADEMARK OFFICE
CERTIFICATE OF CORRECTION

PATENT NO. : 5,000,839

DATED : March 19, 1991

INVENTOR(S) : G.W. Kirker et al.

It is certified that error appears in the above-identified patent and that said Letters Patent is hereby corrected as shown below:

Col. 2, line 37, delete "10"
Col. 4, line 31, delete "," (first occurrence) and "10"
Col. 9, line 53, insert --of the-- before "respective"

Signed and Sealed this

Thirteenth Day of October, 1992

Attest:

DOUGLAS B. COMER

*Attesting Officer*    *Acting Commissioner of Patents and Trademarks*